United States Patent
Weston et al.

(10) Patent No.: US 11,253,838 B2
(45) Date of Patent: Feb. 22, 2022

(54) WATER STABLE COPPER PADDLEWHEEL METAL ORGANIC FRAMEWORK (MOF) COMPOSITIONS AND PROCESSES USING THE MOFS

(71) Applicant: Numat Technologies Inc., Skokie, IL (US)

(72) Inventors: Mitchell Hugh Weston, Chicago, IL (US); Edwin Alfonso Argueta Fajardo, Chicago, IL (US)

(73) Assignee: NuMat Technologies Inc., Skokie, IL (US)

( * ) Notice: Subject to any disclaimer, the term of this patent is extended or adjusted under 35 U.S.C. 154(b) by 0 days.

(21) Appl. No.: 16/993,803

(22) Filed: Aug. 14, 2020

(65) Prior Publication Data

US 2021/0046446 A1    Feb. 18, 2021

Related U.S. Application Data

(60) Provisional application No. 62/887,421, filed on Aug. 15, 2019.

(51) Int. Cl.

| | | |
|---|---|---|
| *B01J 20/22* | (2006.01) | |
| *B01J 20/28* | (2006.01) | |
| *B01J 20/30* | (2006.01) | |
| *B01J 35/02* | (2006.01) | |
| *B01J 35/04* | (2006.01) | |
| *B01J 35/08* | (2006.01) | |
| *B01J 35/10* | (2006.01) | |
| *B01J 37/04* | (2006.01) | |
| *B01J 37/10* | (2006.01) | |
| *B01J 31/16* | (2006.01) | |
| *B01J 31/22* | (2006.01) | |
| *C07F 1/08* | (2006.01) | |
| *B01D 53/86* | (2006.01) | |
| *B01D 53/82* | (2006.01) | |
| *B01D 53/58* | (2006.01) | |

(52) U.S. Cl.
CPC ............ *B01J 20/226* (2013.01); *B01D 53/58* (2013.01); *B01D 53/82* (2013.01); *B01D 53/8634* (2013.01); *B01J 20/28016* (2013.01); *B01J 20/28019* (2013.01); *B01J 20/28038* (2013.01); *B01J 20/28045* (2013.01); *B01J 20/28066* (2013.01); *B01J 20/28073* (2013.01); *B01J 20/3085* (2013.01); *B01J 31/1691* (2013.01); *B01J 35/026* (2013.01); *B01J 35/04* (2013.01); *B01J 35/08* (2013.01); *B01J 35/1028* (2013.01); *B01J 37/04* (2013.01); *B01J 37/10* (2013.01); *C07F 1/08* (2013.01); *B01D 2253/204* (2013.01); *B01D 2255/705* (2013.01); *B01D 2255/9207* (2013.01); *B01D 2257/406* (2013.01); *B01J 2231/005* (2013.01); *B01J 2531/16* (2013.01)

(58) Field of Classification Search
None
See application file for complete search history.

(56) References Cited

U.S. PATENT DOCUMENTS

2008/0190289 A1    8/2008    Muller et al.
2009/0171107 A1    7/2009    Putter et al.

FOREIGN PATENT DOCUMENTS

KR    2019-0026352 A    3/2019

OTHER PUBLICATIONS

Kim et al., "Postsynthetic Ligand and Cation Exchange in Robust Metal-Organic Frameworks." J. Am. Chem. Soc., vol. 134 (2012), 18082-18088 (published Oct. 8, 2012).*
Peterson, "Hierarchical systems through selective deposition and growth of metal-organic frameworks on block copolymers." Proc's of the ECBC ILIR and SSI Programs FY18 (Fiscal Year 2018) report (excerpt), uploaded/published Feb. 2019 to https://www.cbc.ccdc.army.mil/wp-content/uploads/2019/02/FY18_ILIR_Report.pdf.*
Kusgens, "Characterization of Metal-Organic Frameworks by Water Adsorption", Dec. 3, 2008.
Janabi, "Cyclic Adsorption of Water Vapour on CuBTC MOF", Oct. 1, 2017, Publisher: Chemical Engineering Journal.
Decoste, "The Effect of Water Adsorption on the Structure of the Carboxylate", Aug. 19, 2018.

* cited by examiner

*Primary Examiner* — Daniel Berns
(74) *Attorney, Agent, or Firm* — Paschall & Associates, LLC; Mark Goldberg

(57) ABSTRACT

This invention relates to a Cu-BTC MOF which is water stable. The Cu-BTC MOF has been modified by substituting some of the BTC ligand (1,3,5, benzene tricarboxylic acid) with 5-aminoisophthalic acid (AIA). The resultant MOF retains at least 40% of its as synthesized surface area after exposure to liquid water at 60° C. for 6 hours. This is an unexpected result versus the MOF containing only the BTC ligand. This MOF can be used to abate contaminants such as ammonia in gas streams and especially air streams.

10 Claims, No Drawings

WATER STABLE COPPER PADDLEWHEEL METAL ORGANIC FRAMEWORK (MOF) COMPOSITIONS AND PROCESSES USING THE MOFS

CROSS-REFERENCE TO RELATED APPLICATIONS

This application claims priority from provisional application 62/887,421, filed Aug. 15, 2019, incorporated herein in its entirety,

STATEMENT REGARDING FEDERALLY SPONSORED RESEARCH OR DEVELOPMENT

This invention was made with U.S. Government support under Agreement No. W15QKN-18-9-1004 awarded by the ACC-NJ to the CWMD Consortium. The Government has certain rights in the invention.

FIELD

This invention relates to metal organic framework (MOF) materials which are water stable and have a high capacity for ammonia. The invention further relates to methods of preparing and using the MOF materials.

BACKGROUND

Purification of various gaseous stream is important for various applications such as semiconductor manufacture. Additionally, various streams can contain contaminants which can affect the performance of the desired stream. One such compound is ammonia. Ammonia can be present in natural gas streams and must be removed. Ammonia is also toxic to humans and because of its availability can be used as a chemical warfare agent. Thus, there is a need for materials which can sequester or remove ammonia from various gaseous streams.

One class of compounds which has been identified as being capable of removing ammonia are metal organic framework (MOF) materials. MOFs are porous materials comprised of inorganic metal nodes, linked together by at least bidentate organic ligands with capabilities for gas storage. The various combinations of metals and organic linkers allow for tuning of their physical and chemical properties.

HKUST-1 (Hong Kong University of Science and Technology), also known as Cu-BTC, $Cu_3(BTC)_2$, MOF-199 is a copper based MOF, in which paddlewheel Cu-dimers are linked together by 1,3,5 benzenetricarboxylic acid (BTC) to form a 3-dimensional pore structure. Cu-BTC has been shown to be superior to other MOFs for the adsorption of basic gases such as ammonia, due to coordinatively unsaturated Cu-sites. However, Cu-BTC is not water stable losing its porosity and ammonia uptake capacity along with degradation or collapse of its crystalline structure. Thus, Cu-BTC in its powder form is not a viable material for this application. Attempts have been made to make Cu-BTC more water stable. There is one report (Jared B. DeCoste et. al., J. Chemical Science, 2016,7,2711) showing that Cu-BTC when incorporated into a mixed matrix membrane has substantially increased water stability versus the as synthesized Cu-BTC. Although the Cu-BTC/MMM combination has increased water stability, it has the limitation that it can only be used as a membrane and reduces the effective mass of the MOF which is accessible. Another method used to stabilize Cu-BTC is perfluoro alkane plasma treatment, but this treatment reduces the surface area of the Cu-BTC and is very difficult to carry out especially on a large scale. Perfluoro alkanes are also an environmental concern. Accordingly, there still exists a need for a water stable MOF with good ammonia capacity.

Applicants have discovered that Cu-BTC can be made water stable while maintaining its high capacity for ammonia by substituting some of the BTC ligand with 5-aminoisophthatlic acid (AIA). Applicants have also found that taking a Cu-BTC MOF and solvating it with $CH_3CN$ (acetonitrile) followed by activation provides a MOF with greatly improved water stability.

SUMMARY OF THE INVENTION

One embodiment of the invention is a metal organic framework (MOF) composition comprising
a coordination product of a copper metal ion and a mixture of organic ligands selected from 1,3,5-benzenetricarboxylic acid (BTC) and 5-aminoisophthalic acid (AIA). The produced MOF will be referred to herein as Cu-BTC-AIA MOF. The Cu-BTC-AIA MOF is characterized in that it retains at least 40% of its as synthesized surface area after exposure to water at 60° C. for 24 hours. The Cu-BTC-AIA MOF also reacts with or has sorptive affinity for toxic gases selected from ammonia, hydrogen sulfide, hydrogen cyanide, cyanogen chloride, chlorine, nitrogen dioxide, hydrazine, arsine, phosgene, phosphine, and boron trifluoride.

In another embodiment the Cu-BTC/AIA MOF has an as synthesized Brunauer-Emmett-Teller (BET) surface area of at least 1200 or 1300 or 1400 or 1500 or 1600 or 1700 or 1800 $m^2/g$.

In a further embodiment the molar ratio of BTC:AIA in the MOF varies from about 99:1 to about 1:99.

In yet another embodiment the Cu-BTC-AIA MOF retains at least 50%, or at least 60%, or at least 70%, or at least 80% of its surface area after exposure to water at 60° C. for 6 hours In yet another embodiment the Cu-BTC-AIA MOF retains at least 40%, or at least 50%, or at least 60%, or at least 70% of its surface area after exposure to water at 60° C. for 24 hours.

In still another embodiment the CU-BTC-AIA MOF is formed into a shaped body selected from pellets, spheres, disks, monolithic body, irregularly shaped particles, extrudates, and mixtures thereof.

In yet another embodiment the Cu-BTC-AIA MOF is deposited as a layer on a support selected from a monolith, spherical support, ceramic foam, woven fabrics, nonwoven fabrics, membranes, pellets, extrudates, irregularly shaped particles, and mixtures thereof.

In a further embodiment the Cu-BTC-AIA MOF has dispersed thereon at least one catalytic metal selected from zinc, nickel, palladium, platinum, copper, molybdenum, iron, vanadium, manganese, and rhodium.

Yet another embodiment is a process for purifying a gaseous stream comprising a contaminant
the process comprising contacting the gaseous stream with
a) a coordination product of a copper metal ion and a mixture of organic ligands selected from 1,3,5-benzenetricarboxylic acid (BTC) and 5-aminoisophthalic acid (AIA) the Cu-BTC-AIA MOF, the MOF characterized in that it it retains at least 40% of its as synthesized surface area after exposure to water at 60° C. for 24 hours, or b)

a MOF which is a coordination product of a copper metal ion and 1,3,5-benzenetricarboxylic acid (BTC) ligand the MOF characterized in that the copper has open coordination sites which are at least partially occupied by acetonitrile ($CH_3CN$) ($CH_3CN$-CuBTC to at least partially remove the contaminant from the gaseous stream and provide a purified gaseous stream.

Another embodiment is where the contaminant is selected from ammonia, hydrogen sulfide, hydrogen cyanide, cyanogen chloride, chlorine, nitrogen dioxide, hydrazine, arsine, phosgene, phosphine, boron trifluoride, and mixtures thereof.

A specific embodiment is where the contaminant is ammonia and the gaseous stream is air.

Another embodiment is a process for preparing a metal organic framework (MOF) composition comprising:
1) admixing a copper compound with 1,3,5-benzenetricarboxylic acid (BTC) and a solvent to provide a first mixture;
2) heating the first mixture to a temperature of about 25° C. to about 100° C.;
3) adding 5-aminoisophthalic acid (AIA) and reacting the resulting second mixture for a time sufficient to provide the MOF; and
4) isolating the MOF in the form of a powder.

A still further embodiment is a metal organic framework (MOF) composition comprising:
a coordination product of a copper metal ion and 1,3,5-benzenetricarboxylic acid (BTC) ligand the MOF characterized in that the copper has open coordination sites which are at least partially occupied, i.e. exchanged, by an alkyl or aromatic nitrile, a cyclic amine or mixtures thereof. An example of an alkyl nitrile is acetonitrile ($CH_3CN$) (herein referred to as $CH_3CN$-Cu-BTC). An example of a cyclic amine is pyridine (herein after referred to as Pyridine-Cu-BTC). Generally, the alkyl nitrile, aromatic nitrile, cyclic amine or mixture thereof exchanged MOFs are characterized in that they are water stable as shown by their ability to retain a high percentage of their as synthesized surface area after exposure to liquid water at room temperature for 24 hours. Specifically, the $CH_3CN$-Cu-BTC retains at least 40% of its as synthesized surface area after exposure to liquid water at room temperature for 24 hours.

Yet another embodiment is a $CH_3CN$-Cu-BTC MOF material having an as synthesized Brunauer-Emmett-Teller (BET) surface area of at least 1200 $m^2/g$.

A further embodiment is a $CH_3CN$-Cu-BTC MOF material having a gravimetric uptake capacity for ammonia of at least 0.2 g of ammonia per gram of MOF measured at 675 torr and 25° C.

A still further embodiment is a $CH_3CN$-Cu-BTC MOF material having a pore volume of at least 0.5 cc/g.

These and other objects and embodiments will become more evident after a detailed description of the invention.

DETAILED DESCRIPTION OF THE INVENTION

Ammonia is one of the most widely manufactured chemicals with uses in the production of fertilizers. Ammonia is also toxic to humans and because of its wide availability can be used as a chemical warfare agent. This has created a need for materials which can effectively remove ammonia from various gaseous streams such as air. Metal organic framework materials (MOF) are microporous materials with high surface areas which are capable of adsorbing molecules in the internal pores of the structure. One MOF which has been found to have a high capacity for ammonia is HKUNST-1, also known as Cu-BTC or $Cu_3(BTC)_2$, where BTC is benzene 1,3,5-tricarboxylate. Cu-BTC is a copper based MOF, in which paddlewheel Cu-dimers are linked together by benzene 1,3,5-tricarboxylate to form a 3-dimensional pore structure.

However, Cu-BTC is extremely water sensitive and thus not very useful for ammonia capture. Applicants have discovered that Cu-BTC can be made water stable my either synthesizing the MOF using a mixture of ligands or "capping" the copper atoms. By capping is meant that a molecule is coordinatively bonded to open sites of the copper atom.

Thus, one aspect of the invention is replacing some of the BTC with 5-aminoisophthalic acid (AIA). The molar ratio of BTC to AIA can range from about 1:99 to about 99:1, or about 10:90 to about 90:10, or about 30:70 to about 70:30, or about 40:60 to about 60:40. Specific ratios include BTC:AIA of about 50:50 (or 1:1), 25:75(or 1:3), 75:25 (or 3:1), 20:40 (or 1:2) and 40:20 (or 2:1).

The synthesis of Cu-BTC (HKUST-1) was reported by S. S. Y. Chui et. al, Science, 1999, vol. 283, 1148. The synthesis involves reacting a copper salt (cupric nitrate) with BTC in a water ethanol mixture at 180° C. for 12 hours under pressure. In one aspect the synthesis developed by the inventors involves mixing a copper compound selected from cupric nitrate, copper chloride, copper acetate, and copper sulfate with 1,3,5, benzenetricarboxylic acid (BTC) and 5-aminoisophthalic acid (AIA). In the description which follows the copper nitrate is used as the exemplary copper compound, but the invention is not limited to copper nitrate.

The amount of BTC and AIA present in the reaction mixture is such to provide the molar ratios set forth above. The solvent may comprise, water and dimethylformamide (DMF). Optionally, the solvent may additionally contain ethanol and/or nitric acid. The volumetric ratio of water to DMF varies from about 99:1, or from 1:99. When ethanol is also present, the volumetric ratio of water to ethanol is from about 99:1 to about 1:99. The reaction mixture can be prepared in a number of ways. For example, BTC can be dissolved in DMF, then the copper nitrate and water are added, followed by heating to the desired temperature and addition of the desired AIA once the desired temperature is achieved. A second way to prepare the reaction mixture is to dissolve the BTC in ethanol, then add copper nitrate plus water and DMF, heat the mixture to the desired temperature and then add the AIA. A third way to prepare the reaction mixture is to mix the BTC with DMF and water, heat to desired temperature, add copper nitrate followed by AIA. A fourth way to prepare the reaction mixture is to mix the BTC with the DMF and water, heat to desired temperature, add the copper nitrate and nitric acid. The AIA may be added all at once or may be added continuously over a time period from about 5 minutes to about 480 minutes. Applicants have found that adding the AIA continuously over a set period of time provides a MOF with better properties, e.g. increased surface area. Regardless $m^2/g$ of how the reaction mixture is prepared, it is heated to a temperature from about 25° C. to about 120° C. or from about 25° C. to about 100° C., or from about 25° C. to about 75° C. or from about 25° C. to about 50° C. The reaction mixtures is maintained at the desired temperature for a time from about 12to about 48 or from about 12 to about 24. The resulting MOF is isolated by filtration, washed with methanol and then dried at a temperature from about 75° C. to about 150° C. for about 8 to about 72 hours under vacuum.

The Cu-BTC-AIA MOF of the invention is characterized by a Brunauer-Emmett-Teller (BET) surface area of at least 1200 m$^2$/g or at least 1300 m$^2$/g or at least 1400 m$^2$/g or at least 1500 m$^2$/g or at least 1600 m$^2$/g or at least 1700 m$^2$/g or at least 1800 m$^2$/g. More specifically, the MOF has a surface area from about 1300 m$^2$/g to about 2000 m$^2$/g or from about 1500 m$^2$/g to about 1900 m$^2$/g. The MOF also has a gravimetric uptake capacity for ammonia of at least 0.20 g of ammonia per gram of MOF measured at 650 torr and 25° C. More specifically the ammonia capacity varies from about 0.20 g to about 0.45 g of ammonia per gram of MOF or from about 0.20 g to about 0.40g of ammonia per gram of MOF.

The Cu-BTC-AIA MOF of the invention is also characterized in that it crystallizes as blue rectangular crystals.

An important feature of the Cu-BTC-AIA of the invention is that it has much improved stability when exposed to water. For example, when the Cu-BTC-AIA MOF is exposed to water at 60° C. for 24 hours, it maintains at least 40% of its as synthesized surface area, or at least about 50% or at least about 70%, or at least about 80% of its as synthesized surface area. This water stability test is an extreme test which very few MOFs are able to pass. In fact,it has been reported in the literature that Cu-BTC MOF when exposed to 90% relative humidity air at 25° C. loses a considerable amount of its porosity and ammonia capacity and becomes amorphous.

Along with maintaining its surface area, the Cu-BTC-AIA of the invention also maintains its capacity for ammonia uptake. After exposure to water at 60° C. for 24 hours. the MOF of the invention retains at least 40% of its ammonia capacity, or at least 50%, or at least 70% or at least 90% of its ammonia capacity.

Another characteristic of the Cu-BTC-AIA is that it has a pore volume of at least 0.45 cc/g or 0.6 cc/g, or 0.7cc/g. At least 50% of the pore volume is retained after exposure to water at 60° C. for 24 hours.

Another aspect of the invention is a Cu-BTC which has been made water stable by a post synthesis modification. In this case the Cu-BTC is prepared by means know in the art such as that described by S. S. Y. Chui et. al cited above. Once synthesized, isolated, and dried the Cu-BTC MOF is contacted with a ligand which is more strongly bonded to the copper atom than water but less strongly than ammonia. These ligands include alkyl nitrile, aromatic nitriles, cyclic amines and mixtures thereof. Specific examples are acetonitrile (CH$_3$CN), pyridine, and mixtures thereof. Acetonitrile is particularly advantageous and will be use as the exemplary ligand hereafter. However, it is understood that the invention is not limited to acetonitrile. The Cu-BTC is exchanged with acetonitrile by soaking the MOF in acetonitrile for a period of time from about 5 hours to about 20 hours. At the end of the contact period, the MOF material is isolated and then activated at temperatures of about 30° C. to about 70° C. under vacuum for a time from 30 min to 150 min. Activation can be carried out at temperatures of about 40° C. to about 60° C. for a time of about 60 min to about 120 min or temperatures of about 45° C. to about 55° C. for a time of about 80 min to about 100 min or a temperature of about 50° C. for a time of about 90 minutes. This MOF (herein after CH$_3$CN-Cu-BTC) is characterized in that it has much improved stability when exposed to water. For example, when the CH$_3$CN-Cu-BTC MOF is exposed to water at room temperature for six hours, it maintains at least 40% of its as synthesized surface area, or at least about 50% or at least about 70%, or at least about 90% of its as synthesized surface area.

The CH$_3$CN-Cu-BTC also has a high ammonia capacity similar to Cu-BTC. The capacity is at least 0.3 gram of ammonia per gram of MOF.

Although the MOF materials of the invention can be used in the powder form, it advantageous to form the MOF materials into various shaped bodies such as pellets, spheres, disks, monolithic bodies, irregularly shaped particles and extrudates. The methods of forming these types of shapes are well known in the art. The MOF materials can be formed into various shapes by themselves or using a binder. When selecting a binder, it is important to select a binder such that the surface area and ammonia capacity is not adversely affected once the desired shaped body is formed. Materials which can be used as binders include without limitation cellulose, silica, carbon, alumina, and mixtures thereof.

The forming process usually involves preparing a thick paste-like material by mixing the MOF materials with a solvent or a binder and a solvent. Once the paste-like material is formed it can be extruded through a die having holes of about 1-2 mm to form extrudates of varying length, e.g. 6-10 mm. The paste or even the powder itself can be pressed at high pressure to form pellets or pills. Other means of forming shapes include pressure molding, metal forming, pelletizing, granulation, extrusion, rolling methods and marumerizing.

Another aspect of the invention involves depositing a catalytic metal onto the shaped MOF body. The catalytic metal may be chosen from zinc, copper, nickel, chromium, molybdenum, tungsten, niobium, rhenium, vanadium, silver, platinum, palladium, rhodium, iridium, and mixtures thereof. Deposition of a catalytic metal onto the shaped MOF support is carried out by conventional means which usually involve taking a solution containing a compound of the desired metal and impregnating the shaped MOF body with it, followed by drying and optional treatments such as calcination, and/or reduction.

In yet another aspect of the invention, the MOF materials can be deposited onto articles such as, but not limited to, monolith, spherical support, ceramic foam, woven fabrics, nonwoven fabrics, membranes, pellets, extrudates, irregularly shaped particles, and mixtures thereof. When the desired article is a monolith, spherical support, ceramic foam, pellets, extrudates, irregularly shaped particles, a slurry of the MOF material is prepared and deposited on the article by means such as dipping, spray drying, etc. followed by drying and optionally calcination. For membranes it is possible to form the MOF material directly on the membrane. The MOF materials of the invention can be deposited or dispersed onto fabrics (woven and non-woven) or polymers by techniques such as electro-spinning, direct crystal growth, and layer by layer deposition.

The MOF materials of the invention have many uses such as purifying a gaseous stream, especially an air stream, which contains ammonia. The process involves placing the MOF material into a vessel through which the gas stream is flowed through thereby substantially removing the ammonia from the stream. One particular type of purification device is a gas mask wherein the MOF materials of the invention are placed within a cartridge which is part of the mask and through which air passes through. The MOF in the mask can adsorb the ammonia and allow the mask wearer to breathe for a period of time before the ammonia breaks through. Such a device is described in U.S. Pat. No. 10,272,279 which is incorporated by reference in its entirety.

EXAMPLES

Examples 1-5

A series of experiments were conducted in which varying amounts of AIA were incorporated into a Cu-BTC MOF. The parameters used for each experiment are presented in Table 1. The general procedure involved dissolving the BTC in ethanol (when no DMF was used) or DMF (when only DMF and water was used or DMF and ethanol was used). Once the BTC is dissolved, copper nitrate and the remaining solvents, e.g. water or water plus ethanol, are added and the reaction mixture was heated to the desired temperature, at which time the AIA was added, and the final reaction mixture was reacted for the desired amount of time. If nitric acid was added, it was added at the same time as the AIA. The resulting MOF powder was then isolated by filtration, washed with methanol and then dried at 150° C. for 12 hours.

TABLE 1

Effect of Various Parameters on Cu-BTC-AIA MOF Synthesis

| Ex. No. | BTC (g) | AIA (g) | $Cu(NO_3)_2$ (g) | DMF (L) | Water (L) | ETOH (L) | $HNO_3$ (L) | AIA Dosing | Dosing Rate (mL/min) | Reaction Time (hrs.) | Reaction Temp. (° C.) |
|---|---|---|---|---|---|---|---|---|---|---|---|
| 1 | 13.5 | 5.8 | 22.4 | 0.50 | 0.50 | 0.0 | 0.002 | No | N/A | 24 | 90 |
| 2 | 13.5 | 5.8 | 22.4 | 0.50 | 0.50 | 0.0 | 0.0 | No | N/A | 24 | 90 |
| 3 | 13.5 | 5.8 | 22.4 | 0.04 | 0.48 | 0.48 | 0.0 | No | N/A | 24 | 75 |
| 4 | 6.7 | 5.8 | 22.4 | 0.50 | 0.50 | 0.0 | 0.0 | Yes | 0.33 | 24 | 90 |
| 5 | 9.0 | 3.9 | 22.4 | 0.50 | 0.50 | 0.0 | 0.0 | No | N/A | 24 | 90 |

Samples from the examples above were activated under vacuum at 150° C. for 12 hours and examined for their surface area, pore volume and ammonia uptake before and after water treatment. Water treatment was conducted by placing an activated sample of each MOF into a vial of water and then heating the vial at 60° C. for 24 hours. Surface area (BET), pore volume and ammonia uptake (at 675 torr and 25° C.). The results are presented in Table 2.

TABLE 2

Characterization of Cu-BTC-AIA MOFs

| | As Synthesized | | | After Water Treatment | |
|---|---|---|---|---|---|
| Example No. | Surface Area (m2/g) | Pore Volume | NH3 Capacity | Surface Area (m2/g) | Pore Volume |
| 1 | 1820 | 0.75 | 0.4 | 1670 | 0.70 |
| 2 | 1833 | 0.76 | 0.4 | 1626 | 0.67 |
| 3 | 1497 | 0.65 | 0.35 | 1056 | 0.45 |
| 4 | 1190 | 0.49 | 0.28 | 724 | 0.31 |
| 5 | 1686 | 0.70 | 0.40 | 1083 | 0.46 |

Example 6

Cu-BTC was prepared by solvothermal reaction of BTC with copper nitrate. The resulting Cu-BTC was washed with methanol and then soaked in acetonitrile for 18 hours. During this time the acetonitrile was replaced with fresh acetonitrile two times. The $CH_3CN$-Cu-BTC was isolated and one portion of the product was activated in vacuum at 50° C. for 90 minutes. A portion of this activated $CH_3CN$-Cu-BTC was immersed in water for one day and compared to a sample of Cu-BTC. The $CH_3CN$-Cu-BTC sample retained its crystalline appearance, as determined by optical microscope, whereas the Cu-BTC sample showed the presence of mostly amorphous material.

The invention claimed is:

1. A metal organic framework (MOF) composition comprising:
   a coordination product of a copper metal ion and a mixture of organic ligands selected from 1,3,5-benzenetricarboxylic acid (BTC) and 5-aminoisophthalic acid (AIA) the MOF characterized in that it retains at least 40% of its as synthesized surface area after exposure to liquid water at 60° C. for 6 hours and further characterized in that the MOF has an as synthesized Brunauer-Emmett-Teller (BET) surface area of at least 1700 $m^2/g$.

2. The composition of claim 1 further characterized in that the MOF has a gravimetric uptake capacity for ammonia of at least 0.25 g of ammonia per gram of MOF measured at 650 ton and 25° C.

3. The composition of claim 1 where the molar ratio of BTC:AIA varies from about 99:1 to about 1:99.

4. The composition of claim 1 where the molar ratio of BTC:AIA is 1:1.

5. The composition of claim 1 where the molar ratio of BTC:AIA is 1:3.

6. The composition of claim 1 where the molar ratio of BTC:AIA is: 3:1.

7. The composition of claim 1 wherein the MOF retains at least 50% of its surface area after exposure to liquid water at 60° C. for 6 hours.

8. The MOF of claim 1 further characterized in that the MOF is formed into a shaped body selected from pellets, spheres, disks, monolithic body, irregularly shaped particles, extrudates, and mixtures thereof.

9. The MOF of claim 1 further characterized in that the MOF is deposited on a support selected from a monolith, spherical support, ceramic foam, woven fabrics, nonwoven fabrics, membranes, polymers, pellets, extrudates, irregularly shaped particles, and mixtures thereof.

10. The MOF of claim 1 further characterized in that the MOF has dispersed thereon at least one catalytic metal selected from zinc, copper, nickel, chromium, molybdenum, tungsten, niobium, rhenium, vanadium, silver, platinum, palladium, rhodium, iridium, and mixtures thereof.

* * * * *